(12) United States Patent
Specht

(10) Patent No.: US 6,516,726 B2
(45) Date of Patent: Feb. 11, 2003

(54) DEVICE FOR RELEASING GAS FROM A VESSEL

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 36 days.

(21) Appl. No.: 09/904,254

(22) Filed: Jul. 12, 2001

(65) Prior Publication Data

US 2002/0033111 A1 Mar. 21, 2002

(30) Foreign Application Priority Data

Sep. 15, 2000 (DE) .................................. 200 16 041 U

(51) Int. Cl.⁷ ................................................ C06D 5/00
(52) U.S. Cl. .................... 102/530; 280/741; 137/68.13; 102/53.1
(58) Field of Search ................................ 102/530, 531; 280/741; 137/68.13

(56) References Cited

U.S. PATENT DOCUMENTS

| | | | |
|---|---|---|---|
| 4,296,084 A | * | 10/1981 | Adams et al. |
| 5,738,371 A | * | 4/1998 | Blackshire et al. |
| 5,820,162 A | * | 10/1998 | Fink ........................ 137/68.13 |
| 6,010,153 A | * | 1/2000 | Halas et al. ............. 137/68.13 |
| 6,196,584 B1 | * | 3/2001 | Shirk et al. .................. 280/741 |
| 6,247,725 B1 | | 6/2001 | Möller ........................ 280/737 |
| 6,332,404 B1 | * | 12/2001 | Rink et al. ................... 102/530 |
| 6,338,500 B1 | * | 1/2002 | Perotto ........................ 102/530 |

FOREIGN PATENT DOCUMENTS

WO      WO99/12775      3/1999

\* cited by examiner

*Primary Examiner*—Charles T. Jordan
*Assistant Examiner*—Lulit Semunegus
(74) *Attorney, Agent, or Firm*—Lonnie Drayer

(57) ABSTRACT

A device for releasing gas from a vessel drives a piston with a propellant charge that can be ignited by an ignition device. A housing accommodates the piston, the propellant charge and the ignition device. The housing is formed from at least two housing half shells made of plastic material and a load-absorbing sleeve enclosing the housing half shells.

8 Claims, 5 Drawing Sheets

DEVICE FOR RELEASING GAS FROM A VESSEL

FIELD OF THE INVENTION

The present invention relates to a device for releasing inflation gas from a gas storage vessel.

DISCUSSION OF THE PRIOR ART

U.S. Pat. No. 6,247,725 teaches a device for inflating an airbag with compressed gas from a vessel. In this prior art device it is necessary that the device components have exact dimensions to avoid deviations in the force transmitted by a locking element for opening a gas pressure container intended to inflate an airbag. The device of the present invention overcomes this problem.

SUMMARY OF THE INVENTION

There is provided in accordance with the present invention a device for releasing gas from a vessel comprising a cylindrical housing for axially guiding a piston, the cylindrical housing containing a propellant charge that can be ignited by an ignition device, the housing comprises at least two housing half shells which enclose at least the space containing the ignition device and the propellant charge, the housing half shells being held together with an interlocking fit and secured within a load-absorbing sleeve that is rigidly connected to an inflation head fastened to a gas storage vessel.

DETAILED DESCRIPTION OF THE INVENTION

Figure 1:
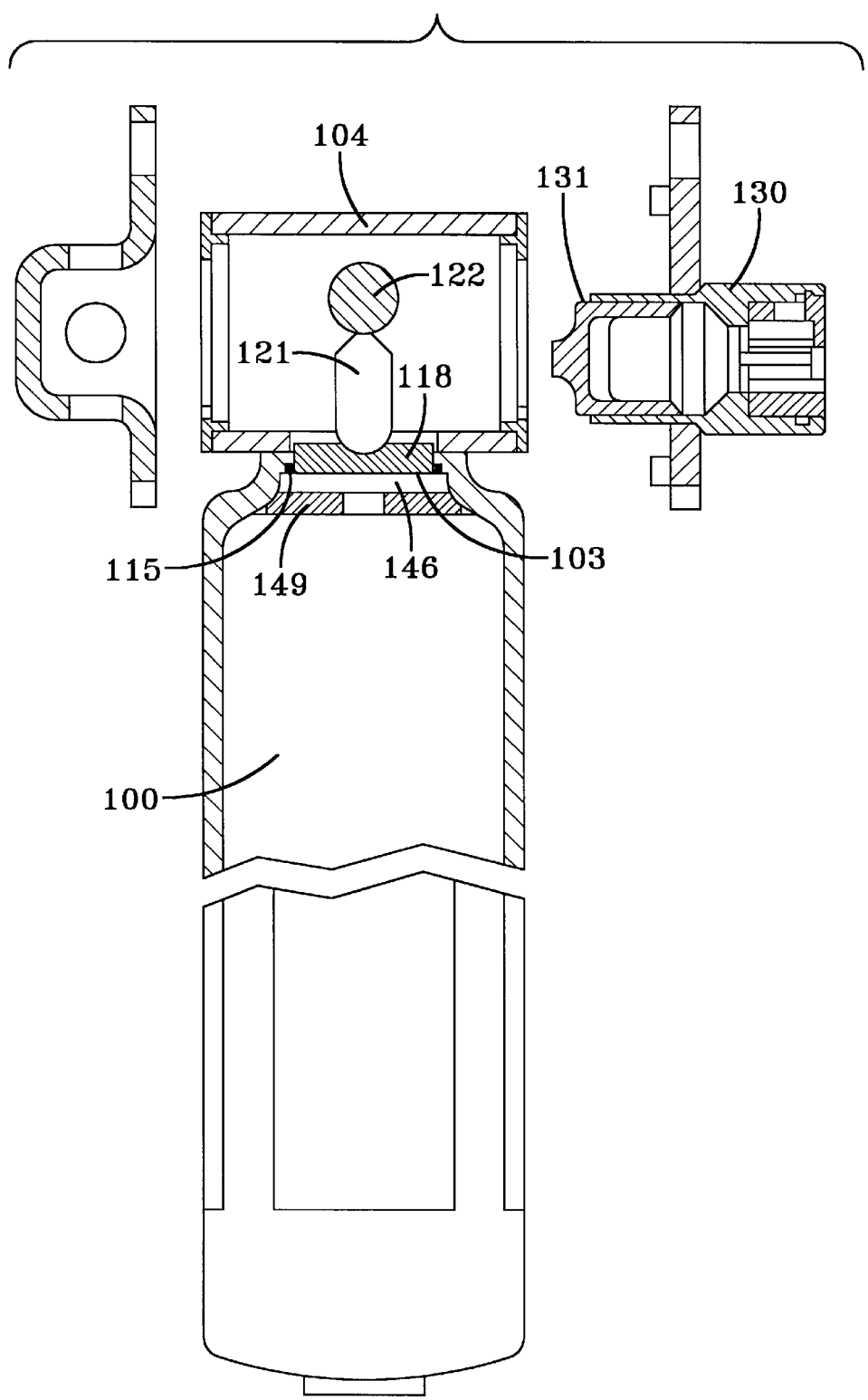
FIG. 1 shows a prior art inflator.

Referring to FIGS. 2–5, the present invention provides a device that can be simply produced for releasing gas from a vessel, wherein forces occurring during the movement of a piston 1 are absorbed by a housing 4. The embodiment of the present invention shown in the drawings has a piston 1 that is axially guided inside a housing 4 along a longitudinal axis 11 of the housing in the direction indicated by an arrow 20 in FIG. 2. The device releases inflation gas from a gas storage vessel 17. The device is inserted laterally in an inflation head 18 that is rigidly connected to the gas storage vessel 17. The gas storage vessel 17 contains an inert gas, such as helium or argon, at a high pressure of, for example, about 600 bar, or an inert gas mix, for example of helium and argon that can be used as inflation gas.

It is known from the prior art, for example from U.S. Pat. No. 6,247,725, which is incorporated herein by reference, that a piston can be used to release gas from a storage vessel. FIG. 1 shows a prior art inflator taught in U.S. Pat. No. 6,247,725 that can be used for inflating an airbag with compressed gas from a vessel. A gas pressure container 100 includes an inflation head 104 that is contiguous to an outlet opening 103. The outlet opening is closed by a sealing element 115 that can be metal foil. The sealing element 115 is attached to a supporting disc 118 that is located in the outlet opening 103. The supporting disc 118 is in turn supported by a centrally arranged locking element 121 at an abutment 122 against the opening forces exerted upon said sealing element 115 by the gas pressure inside the container 100. An opening device is fitted with a triggering mechanism 130 which, when actuated, displaces locking element 121 and the sealing element 115, thereby opening the container outlet 103 and inflating an airbag. The locking element 121 can be moved out of the locking position by a laterally acting force that is produced by a piston 131 of the triggering mechanism 130, to open the gas outlet opening 103. It is suggested that to ensure that the pressure container will open and that an appropriate amount of gas will be released, a throttling member 149 be provided in the gas pressure container 100 in the direction of gas exhaust upstream from the outlet opening 103, with a pressure chamber 146 between said throttling 149 and the outlet opening 103 in the bottleneck. In the known device, the load on the supporting disc 118 produced by the compressed gas is conveyed via the centrally located locking element 121 into the abutment 122 that is rigid with the vessel containing compressed gas. For this purpose, it is necessary that the device components have exact dimensions in order to avoid deviations from the force transmission in the longitudinal axis of the locking element.

In the device of the present invention, as shown in FIGS. 2–5, the piston 1 is used to release the inflation gas contained in a gas storage vessel 17, the piston 1 acting on a locking element, as taught in WO 99/12775 and described in the immediately preceding paragraph. The inflation gas is released by removing a locking element when the piston 1 is driven. The inflator may be inserted into an airbag, not shown in detail, via an inflation head 18. A propellant charge 24 is arranged in a propellant cartridge in the housing 4 and is used to propel the piston. An electric ignition device 3 ignites the propellant charge 24. For this purpose, there is arranged in the housing 4, a plug socket 8, via the contacts 19 of which electric ignition of the propellant charge 24 is achieved.

The housing 4 comprises on the exterior a load-absorbing sleeve 7 made of metal, in particular steel. The housing half shells 5, 6 are pressed into the load-absorbing sleeve 7. Two housing half shells are provided in the embodiment shown. The housing half shells enclose at least a space containing the ignition device and the propellant charge at its periphery. The piston can be guided inside or on the outside of the two housing half shells. The housing half shells are held together with an interlocking fit and are secured against rotation by the load-absorbing sleeve. An interlocking connection is obtained in the axial direction between the load-absorbing sleeve and the internal housing half shells by impressions, in particular a peripheral groove pressed into a corresponding depression on the exterior of the housing half shells. The housing half shells can be provided with fixing knobs so that they automatically align with one another when pressed into the load-absorbing sleeve 7. It can be ensured by positioning points provided asymmetrically on the periphery of the housing half shells, for example projections or recesses, that a plug socket for an electric ignition device with which the propellant charge is ignited, is positioned true to the angle of rotation in the housing. The housing half shells 5, 6 preferably comprise high temperature-resistant plastic materials, in particular thermosetting materials.

To absorb thrust forces when the piston 1 is driven by the ignited propellant charge, the load-absorbing sleeve 7 is pressed into a peripheral depression of the housing half shells 5, 6, for example by tumbling or flanging. As a result, a peripheral depression 12 in the form of a groove develops on the exterior. The load-absorbing sleeve can be exchanged simultaneously with the tumbling or flanging process. As a result there is an interlocking connection between the load-absorbing sleeve 7 and the two housing half shells 5, 6. Thrust forces acting on the housing half shells are effectively introduced into the load-absorbing sleeve.

Figure 2:
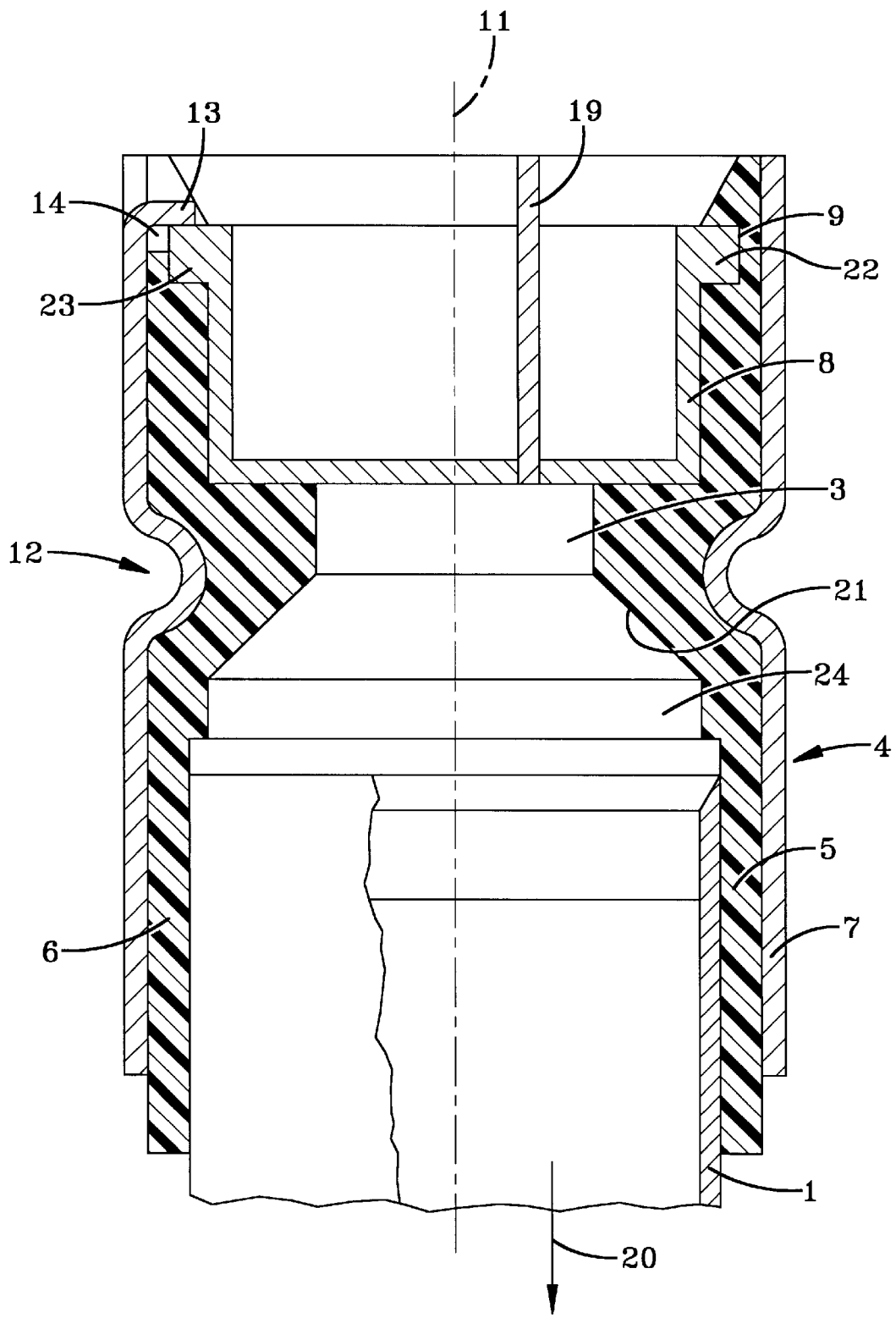
FIG. 2 is a sectional view of a device according to the present invention taken along line 2—2 in FIG. 3.

The peripheral depression 12 or peripheral groove is located behind the propellant charge 24, when viewed in the drive direction, indicated by an arrow 20 in FIG. 2. The cartridge containing the propellant charge 24 is preferably supported on a conical constriction 21 of the housing half shells 5, 6. As shown in FIG. 2, the load acting in the region of this constriction is effectively introduced into the load-absorbing sleeve 7 in the region of the peripheral depression 12. On the ignition connection side, which is the upper end face in FIG. 2, the two housings have housing half shells 5, 6 and positioning points 9, 10 in the form of recesses. These recesses are shown in plan view in FIG. 3. Projections of a plug socket 8 project into these recesses or positioning points 9, 10, which plug socket is inserted into a corresponding recess on the end face of the housing half shells 5, 6. The plug socket 8 with its contact pins forms the electric ignition connection side for the ignition device 3. The positioning points 9, 10 that have an asymmetric arrangement with respect to the housing axis 11 ensure that the plug socket 8 is correctly positioned in the appropriate housing recess. This ensures, as a result, that the contact pins 19 are aligned in the correct position with the corresponding sockets. In the embodiment shown, the angular distance α between the positioning points 9, 10 can be approximately 160° to 170°, in particular 165°.

Figure 3:
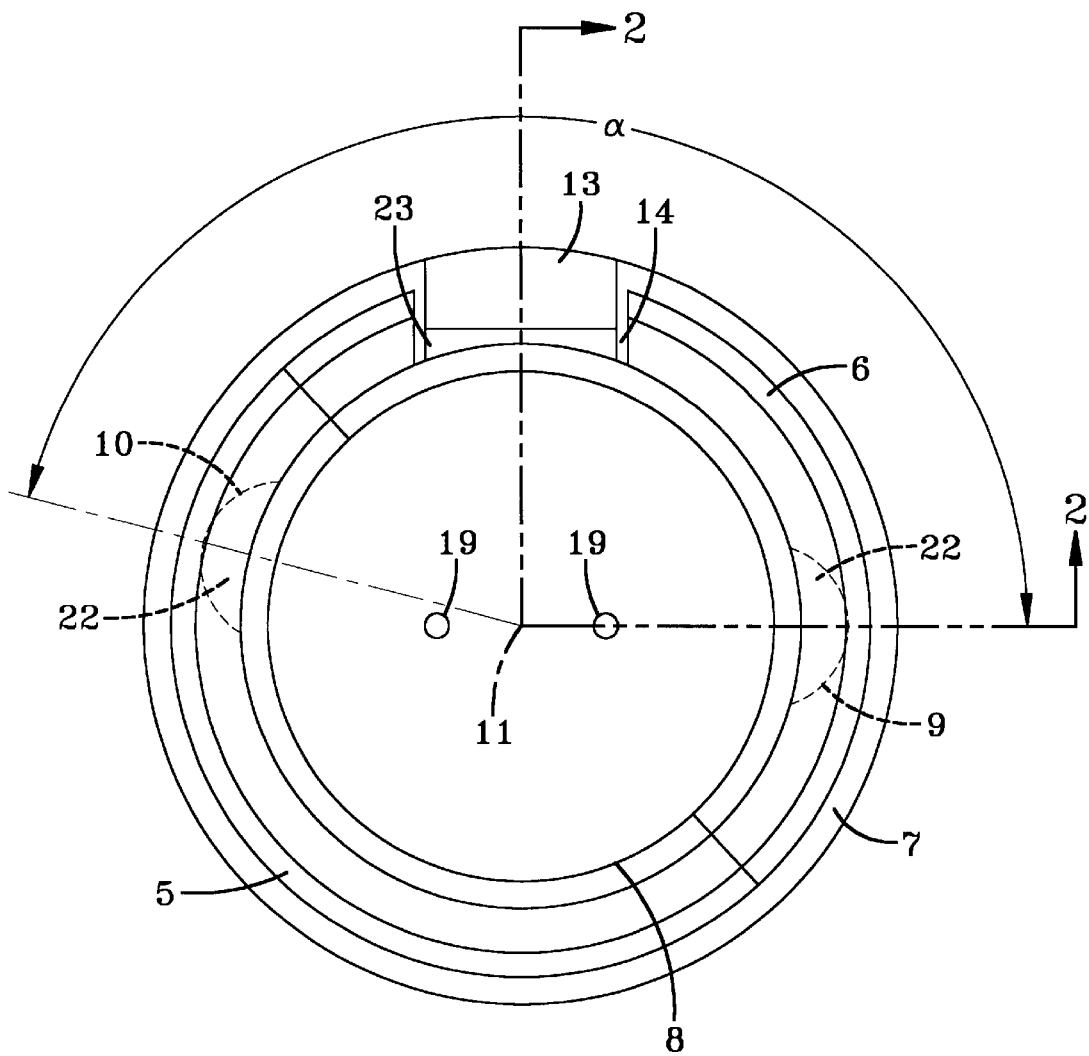
FIG. 3 is a plan view of the end face of the housing located at the top in FIG. 2.

In the top end face in one or both housing half shells 5, 6, a recess 14 is further provided into which a sleeve segment 13 is driven through a 90° angle which can also be seen from the section in FIG. 2 along the section line 2—2 in FIG. 3. As a result, the housing half shells 5, 6 and the plug socket 8 are fixed in position. A corresponding projection 23 can be molded onto the plug socket for this purpose, which projection projects into the recess 14 of the housing half shells 5, 6. Projections 22 adapted to the positioning points 9, 10 are also molded onto the plug socket 8, which projections are located in the recesses of the positioning points 9, 10.

In the invention the two housing half shells 5, 6 form the internal contour of the housing 4 and forces acting during the piston drive, in particular counter-thrust forces, are introduced via the load-absorbing sleeve 7 into the inflation head 18.

Figure 4:
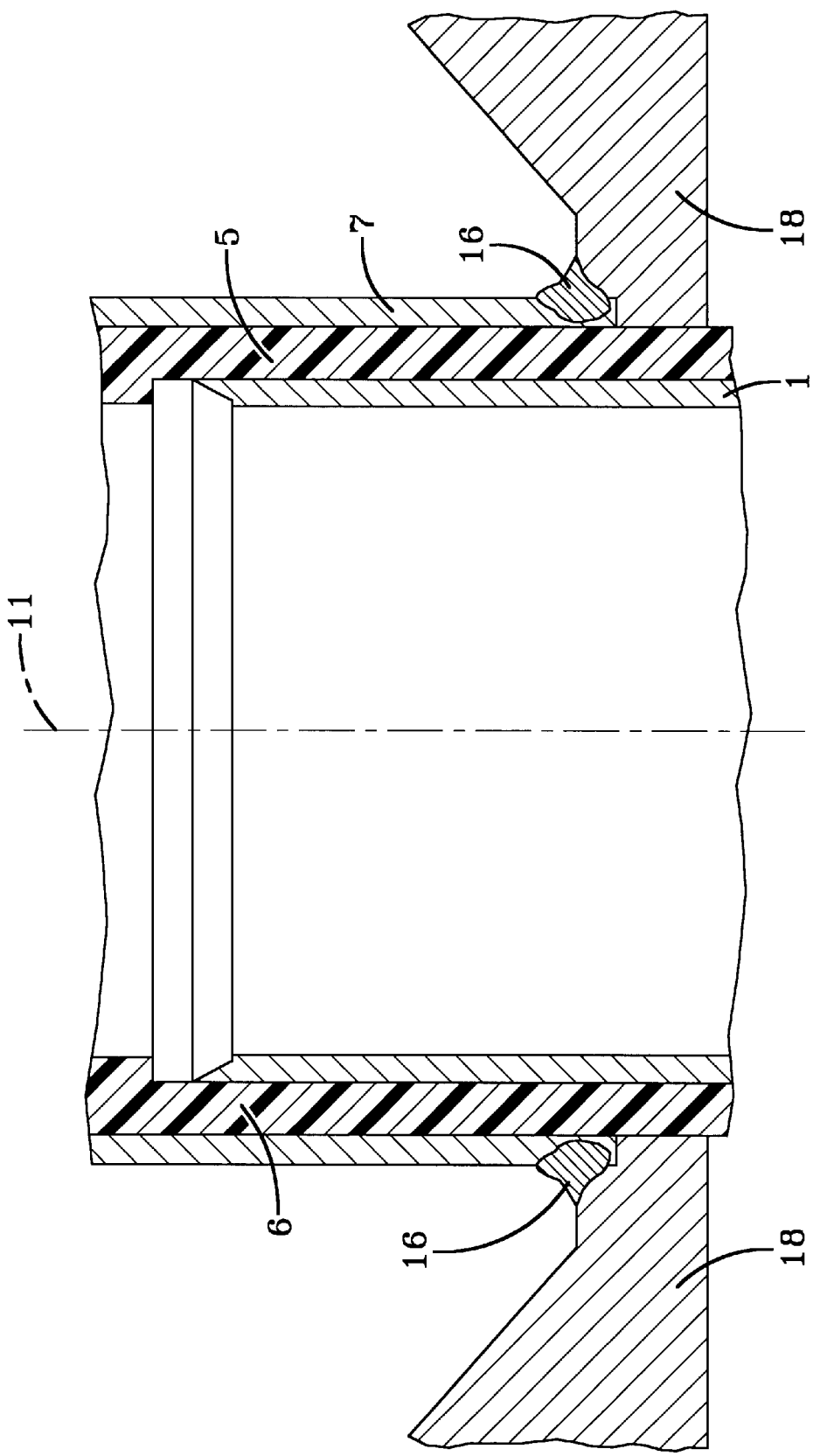
FIG. 4 is a sectional view of the housing in the region of the rigid connection to an inflation head.
Figure 5:
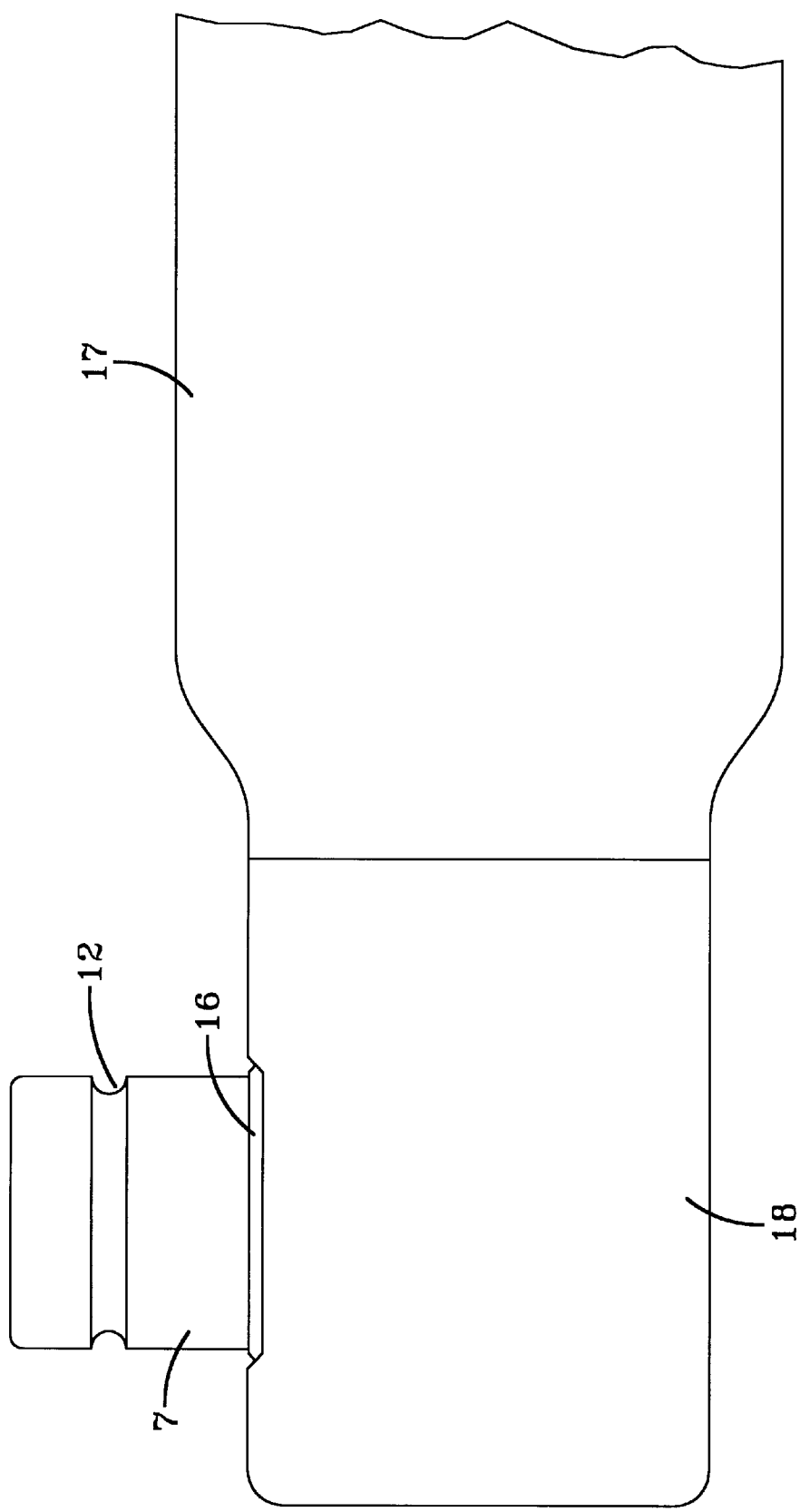
FIG. 5 shows the arrangement of the device according to the present invention on an inflation head of a gas storage vessel.

The housing 4 with the components arranged therein, namely the piston 1, the propellant charge 24, the ignition device 3 and the plug socket 8, are preassembled as a modular unit. This preassembled modular unit is inserted into an appropriate aperture of the inflation head 18 and the lower edge in FIG. 2 of the load-absorbing sleeve 7 is welded to the inflation head 18. For this purpose the lower edge of the load-absorbing sleeve can be countersunk in a graduated hole in the inflation head 18 in which a peripheral weld connection 16 is formed as shown in FIG. 4. The annular weld seam of the weld connection 16 can be produced by precision laser radiation. As already described, the load-absorbing sleeve 7 preferably comprises metal, in particular steel. A cold extrusion pressed part is also suitable.

It is understood that the invention is not limited to the particular construction and arrangement of parts herein illustrated and described, but embraces such modified forms thereof as come within the scope of the following claims.

I claim:

1. A device for releasing gas from a vessel comprising a cylindrical housing for axially guiding a piston, the cylindrical housing containing a propellant charge that can be ignited by an ignition device, the housing comprises at least two housing half shells which enclose at least the space containing the ignition device and the propellant charge, the housing half shells being held together with an interlocking fit and secured within a load-absorbing sleeve that is rigidly connected to an inflation head fastened to a gas storage vessel.

2. The device for releasing gas from a vessel according to claim 1 wherein the ignition device comprises a plug socket located on an end face of the housing and positioned true to the angle of rotation in the housing by asymmetrical positioning points provided at the periphery of the housing half shells around the housing axis.

3. The device for releasing gas from a vessel according to claim 1 wherein the load-absorbing sleeve is pressed into one or more recesses provided at the external periphery of the housing half shells.

4. The device for releasing gas from a vessel according to claim 3 wherein the recess is designed as a peripheral groove.

5. The device for releasing gas from a vessel according to claim 2 wherein the load-absorbing sleeve at the end face of the housing on which the ignition device is located, comprises a bent sleeve segment arranged in a recess of the housing half shells.

6. The device for releasing gas from a vessel according to claim 1 wherein the load-absorbing sleeve is fastened on the inflation head by a welded joint.

7. The device for releasing gas from a vessel according to claim 1 wherein the housing half shells comprise a heat-resistant plastic material and the load-absorbing sleeve comprises metal.

8. The device for releasing gas from a vessel according to claim 1 wherein the piston is a percussion piston.

* * * * *